United States Patent [19]
Labelle

[11] 3,734,221
[45] May 22, 1973

[54] ENDLESS TRACK VEHICLE

[76] Inventor: Richard L. Labelle, 405 Wood St., Sherbrooke, Quebec, Canada

[22] Filed: June 4, 1971

[21] Appl. No.: 150,155

[52] U.S. Cl. .................................. 180/5 R, 280/28
[51] Int. Cl. .......................................... B62m 27/02
[58] Field of Search .................. 180/5, 9.24, 9.24 A, 180/9.54

[56] References Cited

UNITED STATES PATENTS

| | | | |
|---|---|---|---|
| 3,011,576 | 12/1961 | Howes | 180/5 R |
| 3,412,821 | 11/1968 | Humphrey | 180/5 R |
| 2,289,768 | 7/1942 | Fehrenbacher | 180/5 R |
| 2,702,088 | 2/1955 | Klimek | 180/5 R |
| 3,221,830 | 12/1965 | Walsh | 180/5 R |

FOREIGN PATENTS OR APPLICATIONS

| | | | |
|---|---|---|---|
| 636,795 | 10/1936 | Germany | 180/9.24 R |

*Primary Examiner*—Richard J. Johnson
*Attorney*—Pierre Lesperance

[57] ABSTRACT

An endless track motor vehicle, more particularly a snowmobile, in which the engine and the transmission are surrounded by the endless track belt and the resulting assembly movably mounted within the vehicle chassis and suspended by spring and shock-absorbing means. The vehicle is also provided with a specially designed ski and with means to maintain the track bottom run in a curved shape to provide greater ease in steering, especially on a hard surface. The vehicle is much safer to operate than conventional snowmobiles, because the rubber endless track shields the passenger from the engine and associated moving parts, and because the vehicle has a lower center of gravity, effectively separates the gasoline reservoir from the engine and has its engine located behind and below the passengers, whereby the latter are not subjected to toxic exhaust gases. The snowmobile also has greater maneuverability, can be easily converted into a vehicle for summer use and can be easily taken apart for repair and the like.

31 Claims, 25 Drawing Figures

INVENTOR
Richard L. LABELLE
BY Pierre Lesperance
AGENT

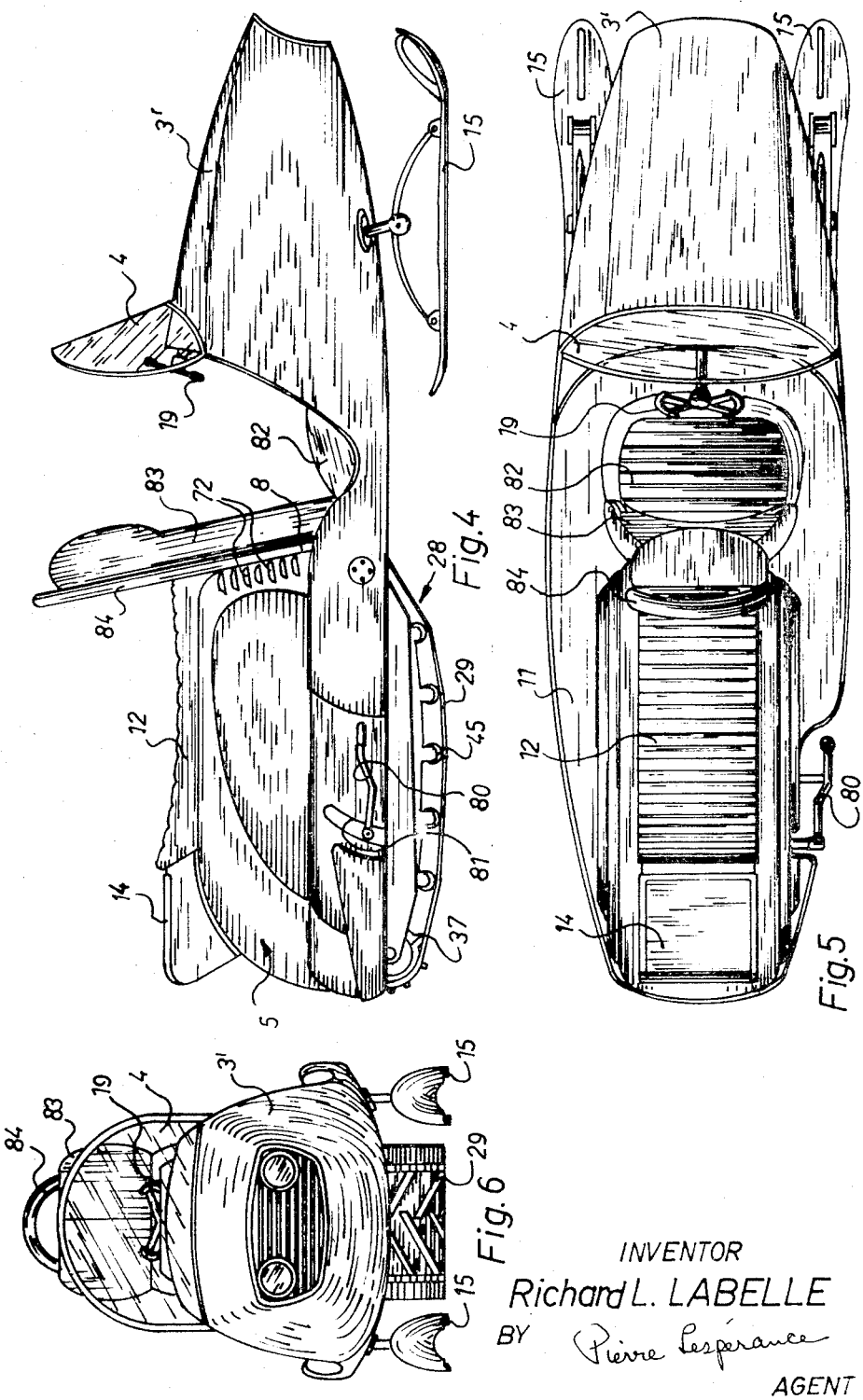

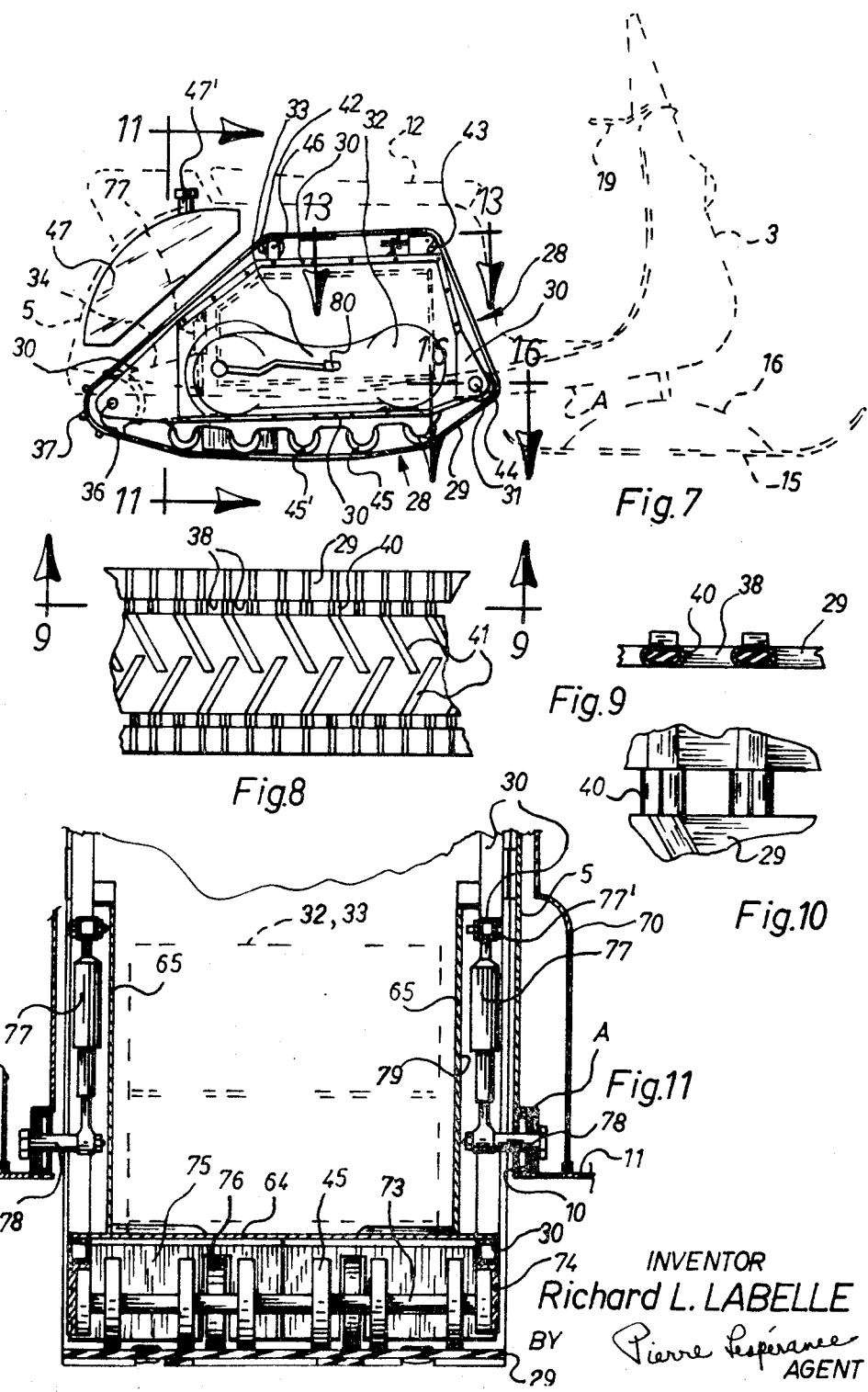

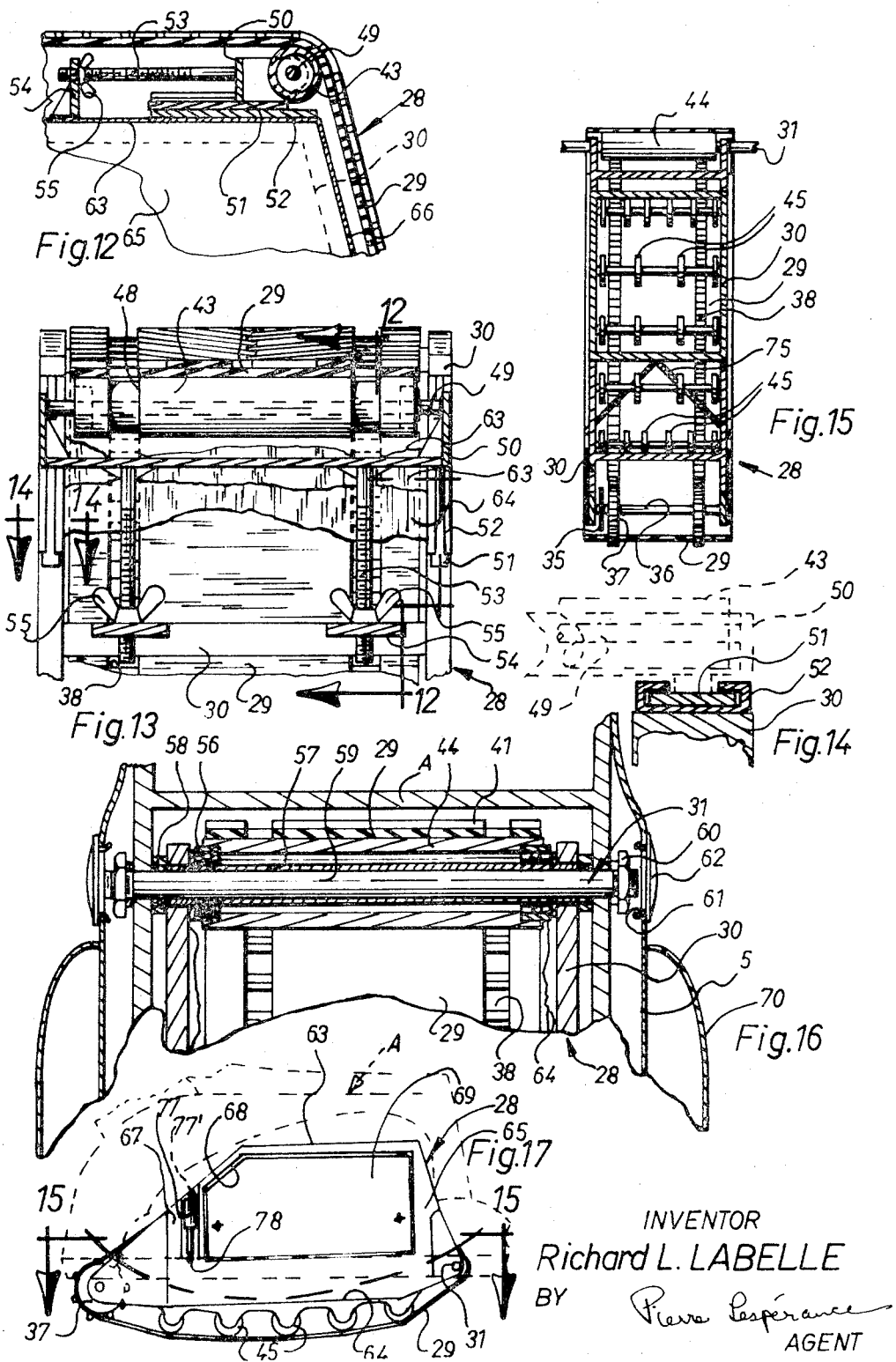

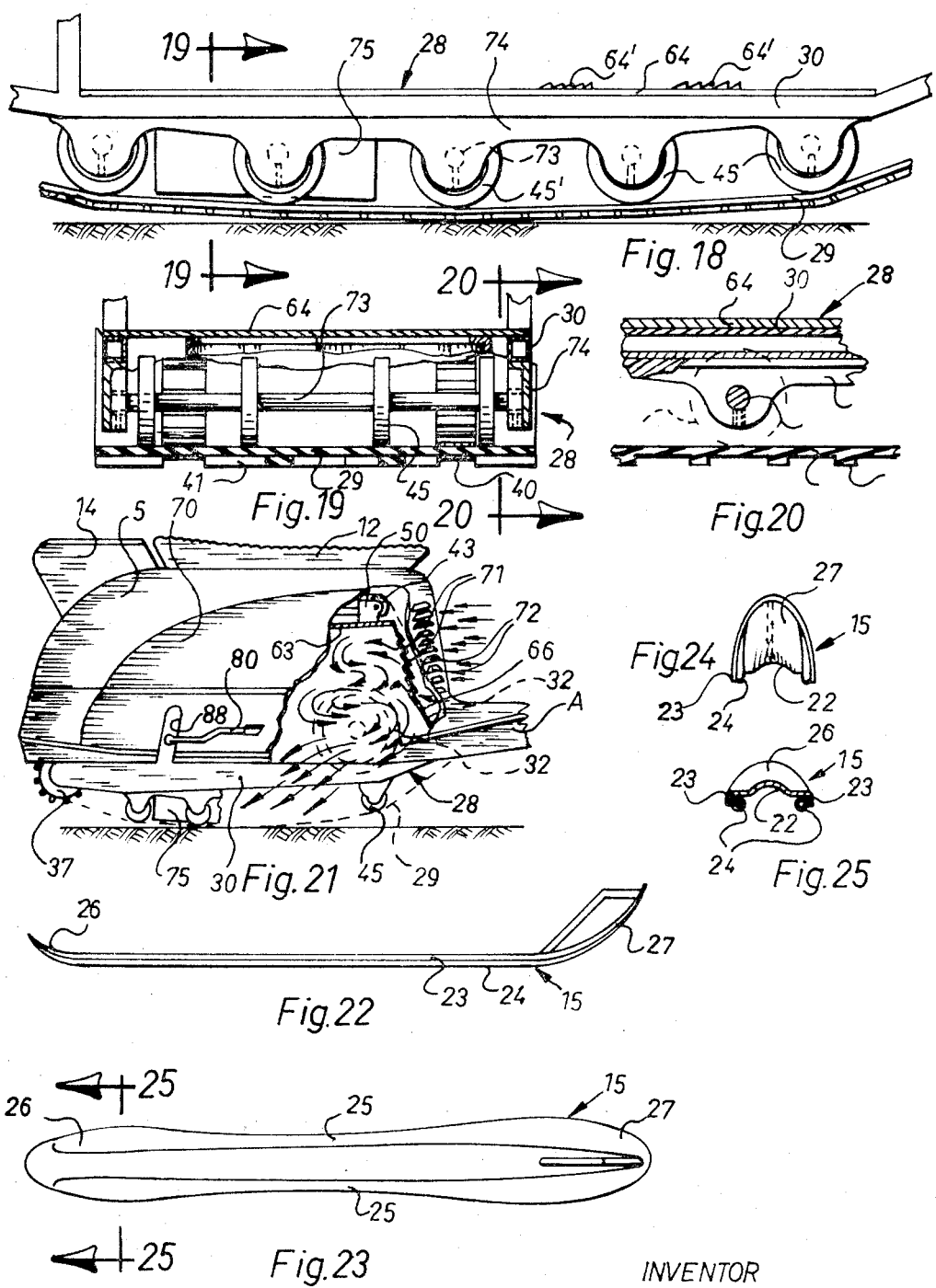

ENDLESS TRACK VEHICLE

The present invention relates to an endless motor track vehicle of the half-track type in which a steerable ground-engaging member and, more particularly a ski, helps to support the vehicle and steers the same over snow and other ground surfaces.

Conventional snowmobiles have several disadvantages, mainly concerning the safety of the passengers. Because the engine and the gasoline reservoir are mounted right in front of the vehicle and, consequently, of the passengers, the latter are frequently burnt in a front collision, setting the reservoir or engine on fire. Also, the passengers are directly exposed to the rotating parts of the engine and transmission, which is a frequent cause of accidents when worn parts break and fly off under centrifugal force. The passengers are frequently exposed to the toxic exhaust fumes of the engine.

Conventional snowmobiles are dangerous in emergencies, because they do not steer quickly, especially on a hard surface; this is due to the fact that the passengers are seated on top of the track and well behind the steering ski and that the track presents a flat surface engaging the ground over an elongated area, thereby resisting any turning movement of the vehicle.

The engines of conventional snowmobiles require pulling of the starting rope with a hand and, consequently, unduly exerts the operator. Even snowmobiles provided with an electric starter often require hand starting.

Passengers of a conventional snowmobile are seated in a bent-over position due to the small height between the seat and the footrest and, in that position, do not enjoy good visibility and are often indisposed by the engine smell. Consequently, the driver more often tends to ride the vehicle with one knee on the seat, which is dangerous because the upper body portion is exposed to trees, branches, guy wires and the like, while being unable to react quickly because of the instability of that position.

In conventional snowmobiles, the snow-engaging bottom run is driven from the front and is therefore slack and tends to take a wavy form, reducing the operating efficiency.

The endless track of the conventional snowmobile is difficult to take apart for repair or replacement, because all the bogey wheels, runners and sprocket wheels must be removed before the endless track itself can be removed.

It is accordingly the general object of the invention to provide a snowmobile which will obviate the above-noted disadvantages.

A more specific object of the invention is to provide a snowmobile which is much safer to operate than conventional snowmobiles, because the engine and the gasoline reservoir mounted behind and/or below the passengers themselves and because the engine and its transmission are effectively separated by the endless track belt, both from the passengers and from the gasoline reservoir.

Another object of the present invention resides in a snowmobile of the character described, which is much easier to steer due to the special form of its skis, to the shape imparted to the bottom run of the endless track and because the passengers and machine weight are better distributed.

Another object of the invention resides in the provision of a snowmobile of the character described, which affords a more natural seating arrangement than in conventional snowmobiles, whereby the riders will have less tendency to stand up on the vehicle, and if they do, the weight of their body can be transmitted to their feet, allowing them to lower the center of gravity of the machine while being only a few inches from the comfortable seating position.

Another object of the invention resides in a snowmobile of the character described, having much more comfortable riding and suspension characteristics than the conventional snowmobiles.

Another object of the invention resides in the provision of a snowmobile of the character described, in which starting of the engine is accomplished by a kick-down lever operated by the driver's foot, resulting in much less exertion of the latter to start the vehicle, this being possible due to the location of the engine.

Another object of the present invention resides in the provision of an endless track belt provided with improved traction means which prevents side slipping of the vehicle on hard surfaces.

Another object of the invention resides in the provision of snowmobile in which the endless track belt and the engine are mounted on a common frame easily detachable from the vehicle chassis with the track surrounding said frame, whereby the latter can be easily removed if broken and/or worn out.

Another object of the invention resides in a snowmobile of the character described, in which the track drive is mounted at the rear of the track, resulting in a taut condition of the ground-engaging bottom run of the track and, therefore, in improved riding efficiency of the vehicle.

Another object of the invention resides in the provision of a snowmobile of the character described, in which various seating arrangements can be provided, including embodiments in which one or two passengers may be seated in front of the engine and the track, resulting in complete protection for the passengers and in a low overall center of gravity for the vehicle and passengers. Still another object of the invention resides in the provision of means to deaden the sound emitted by the vehicle motor and drive means.

The foregoing and other objects of the present invention will become more apparent during the following disclosure and by referring to the drawings, in which:

FIG. 4 is a side elevation of a second embodiment of the snowmobile in accordance with the invention;

FIG. 5 is a top plan view of the second embodiment;

FIG. 6 is a front end elevation of the second embodiment;

FIG. 7 is a side elevation of the sub-carriage or endless track assembly mounted in the body of the snowmobile in accordance with the first embodiment, the snowmobile body being shown in dotted lines, and the side panel of the assembly being removed to show the engine and transmission;

FIG. 8 is a partial plan view of the ground-engaging face of the endless track belt;

FIG. 9 is a partial longitudinal section along line 9—9 of FIG. 8;

FIG. 10 is a partial plan view, on an enlarged scale, of the ground-engaging face of the endless track belt;

FIG. 11 is a cross-section, taken along line 11—11 of FIG. 7, and in association with the snowmobile body;

FIG. 12 is a partial longitudinal section of the top front corner of the subcarriage showing the belt tightening system, said section taken along line 12—12 of FIG. 13;

FIG. 13 is a partial section taken along line 13—13 of FIG. 7;

FIG. 14 is a partial cross-section taken along line 14—14 of FIG. 13;

FIG. 15 is a plan section of the undercarriage, taken along line 15—15 of FIG. 17;

FIG. 16 is a partial plan view, on an enlarged scale, taken along line 16—16 of FIG. 7 and showing the pivotal connection of the undercarriage to the vehicle chassis;

FIG. 17 is a side elevation of the subcarriage;

FIG. 18 is a partial side elevation of the bottom run and lower part of the subcarriage;

FIG. 19 is a cross-section taken along line 19—19 of FIG. 18;

FIG. 20 is a partial longitudinal section, taken along line 20—20 of FIG. 19;

FIG. 21 is a side elevation, partially cut away, of the rear part of the vehicle and showing the ventilating system for the engine;

FIG. 22 is a side elevation of one of the skis;

FIG. 23 is a top plan view of the ski;

FIG. 24 is a front end elevation; and

FIG. 25 is a cross-section of the ski taken along line 25—25 of FIG. 23.

In the drawings, like reference characters indicate like elements throughout.

Figures 1, 2:
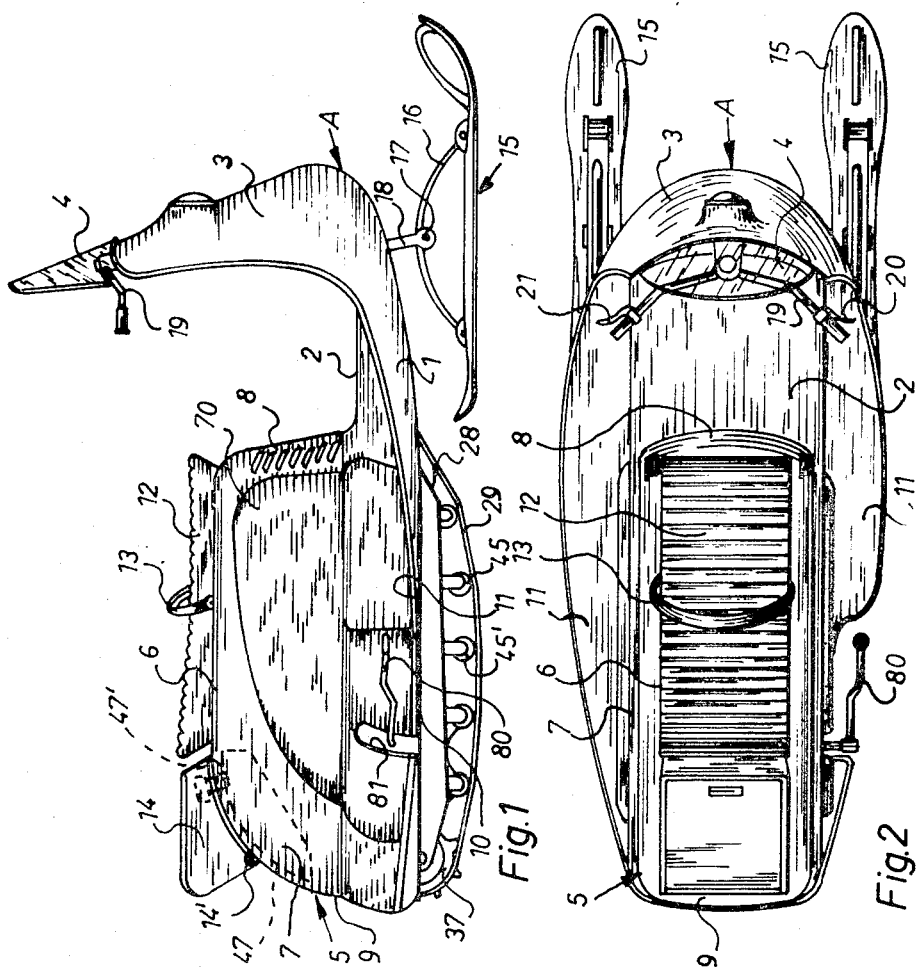
FIG. 1 is a side elevation of a first embodiment of a snowmobile in accordance with the invention.
FIG. 2 is a top plan view of the first embodiment.
Figure 3:
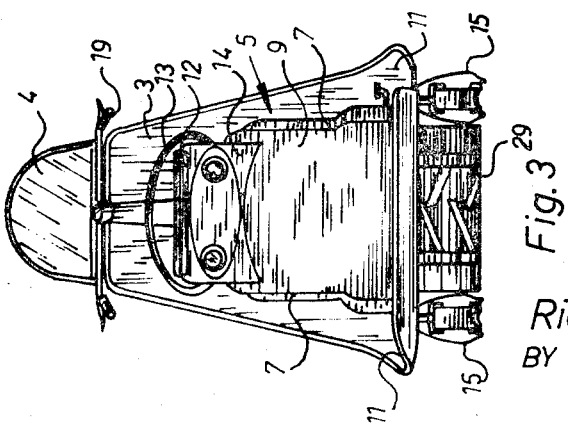
FIG. 3 is a rear end elevation of the first embodiment.

The snowmobile in accordance with the first embodiment of the invention, generally illustrated in FIGS. 1, 2, 3, comprises a vehicule body or chassis A defining a front portion 1 providing a platform 2 from the front end of which upwardly extends a front guard wall 3 extended by a transparent windshield 4.

The rear portion of the chassis A forms a hood 5 having a top wall 6, side walls 7, a front wall 8 and a back wall 9.

Hood front wall 8 upstands upwardly from platform 2 and the top wall 6 is therefore at a higher level than the platform. The hood 5 is hollow and is open at its bottom, as shown at 10 in FIG. 11, and therefore the snowmobile chassis A defines at its rear portion a box-like enclosure open at its bottom. Said chassis forms foot-rests 11 on both sides of the hood 5 and which merge with platform 2.

An elongated passenger seat 12 is secured on top of the hood 5 and is normally long enough to seat two passengers one behind the other, the rear passenger holding himself by means of the grab strap 13 secured to the hood 5 over the seat in an intermediate portion of the latter.

Behind the seat is a storage box or compartment 14 which, when lifted on its hinges 14', exposes the gas filling cap 47'. The front of the vehicle is supported by a pair of ground-engaging steerable ski 15. Each ski 15 is provided with the usual leaf spring suspension 16, which is pivoted at its center for rotation about a transverse horizontal axis at 17 to the lower end of an upwardly and rearwardly inclined control rod 18 rotatably mounted within the snowmobile chassis for movement about its long axis to steer the ski while laterally tilting the same downwardly in the direction of turning movement.

The control rod 18 for each of the two skis or for one centrally located ski, if only such one ski is provided, is controlled by a suitable steering mechanism (not shown) in turn controlled by a handle bar 19 carried by the front guard wall 8 and accessible to the driver seated on the front portion seat 12 with his feet on platform 2 or foot-rest 11.

The handle bar 19 carries the usual accelerating lever 20 and braking lever 21. A change speed lever (not shown) and other accessories are mounted on handle bar 19 and/or guard wall 3.

For more efficient steering, the ski, as shown in FIGS. 22 to 25, have at their ground-engaging underface a longitudinally extending central groove 22, while their longitudinal edges are downwardly bent to form flanges 23, preferably reinforced by rods 24 secured to the skis and running longitudinally of and inside the flanges 23 at the bottom surface and serving to limit the wear along the ski edges when the ski is tilted laterally and running along one edge.

The longitudinal edges of the skis are slightly concave, as shown at 25, so that the intermediate portion of the ski is of smaller width than the end portions thereof.

The back end 26 of the ski is upwardly curved, as well as the front end 27, so that the vehicle can be easily backed up without the rear end digging into the snow.

Inside the hood 5 and extending through the bottom opening 10 thereof, is located a subcarriage assembly, generally indicated at 28, and including an endless track 29 adapted to engage and thrust against the ground for moving the vehicle thereon.

As shown in FIG. 7, the subcarriage 28 comprises a rigid box-like frame 30 with the track 29 forming a close loop surrounding said frame 30. The frame 30 is pivotally connected to the chassis A by a transverse pivotal connection 31, so as to be movable in a vertical plane. Although shown at the front end of subcarriage 28, pivot 31 can be located further back and even at the back end of the subcarriage. The pivot 31 can be modified to move up and down against a spring to also allow the front end of the subcarriage to absorb shocks. The carriage can also be mounted for bodily up-and-down movement as well as pivotal movement.

An internal combustion engine 32, together with a multispeed transmission 33, forms a unit mounted within frame 30. The output shaft of the transmission 33 is connected by a chain drive 34 to a sprocket gear 35 keyed to a shaft 36 transversely disposed and journalled within frame 30 at the back end thereof.

Toothed wheels 37 are keyed to shaft 36 and are adapted to mesh with two longitudinal rows of holes 38 along track 29. The web of the track extending between the holes 38 are preferably lined with a metal sleeve or clip 40 to reduce wear. The inside face of the track is smooth, while the outside face, as shown in FIGS. 8 and 9, is provided with two longitudinal rows of straight ribs 41 with the ribs of each row parallel to each other and inclined with respect to the long axis of the belt, the ribs of one row being oppositely and equally inclined to the ribs of the other row, the inner ends of the ribs extending between the inner ends of the ribs of the other row past the center line of the belt, so as to form a chevron design which greatly reduces lateral slipping.

The inner surface of the track belt 29, which is preferably made of rubber reinforced with canvas or the like and with transverse steel bars, if desired, is trained on the driving sprocket wheels 37 and on rollers and/or wheels 42,43,44, and 45.

The roller 42 extends transversely across the top of the frame 30 and is rotatably mounted in end brackets 46, secured to the frame 30 in such a position that the portion of the track 29 extending between the toothed wheels 37 and the roller 42, is upwardly and forwardly inclined, so as to leave space within the rod 5 for positioning of a gasoline reservoir 47 within the hood and spaced from the outside of the track 29.

Track engaging wheel 43 is in the form of a roller serving to tension the track. As shown in FIGS. 12 and 13, this roller 43 has grooves 48 near its end in alignment with and engaging the clips or sleeves 40. The roller 43 is rotatably mounted on a transverse shaft 49 which is carried by a bracket 50 having pads 51 slidably mounted and guided in guide rails 52 secured to the top of frame 20 on each side thereof.

Bolts 53 extending longitudinally of the frame 30 on each side thereof freely extend through brackets or abutment members 54 secured to the top of frame 30. Wing nuts 55 are threaded on the bolts 53 and abut members 54 to displace brackets 50 longitudinally of the frame 30 and thus adjust the positioning of roller 43 and, therefore, adjust the tension of the belt track 29.

The roller 44 is rotatably mounted about the pivotal connection 31 of the subcarriage 28 to the chassis A. As shown in FIG. 16, the roller 44 is journalled by bearings 56 on a tube 57, which extends through the frame 30 and is secured thereto by spacer nuts 58 screwed on the threaded outer ends of tube 57.

A rod 59, threaded at both ends, is slidably fitted within tube 57 and extends through holes made in the chassis A and is secured in position by nuts 60.

Access to the nuts and to the rod 59 is had from the outside of the vehicle through registering holes 61, normally closed by removable cap 62. Thus, the pivotal connection may be easily disassembled to remove the subcarriage 28 from the chassis A.

The frame 30 is completely closed to form a box completely surrounding the engine and its transmission 33 to prevent access of snow or other foreign material to the engine. For this purpose, frame 30 carries a top panel 63, a bottom panel 64, side panels 65, front panel 66 and back panel 67.

One of the side panels 65 is provided with a servicing opening 68, normally closed in a fluid-tight manner by a removable door 69 (see FIG. 17). The hood 5 is similarly provided with an opening registering with servicing opening 68 and normally closed by removable panel 70. Thus, access to the engine and its transmission is easily had. However, air must be circulated to the internal combustion engine and, for this purpose, as shown in FIG. 21, intake louver type, properly shielded openings 71, are made in the front panel 66 of the box enclosing the engine. The shields of said openings are downwardly inclined and disposed behind track 29 and the front portion of the side walls 7 of the hood 5 is also provided with a series of shielded openings 72 to make air communication with the openings 71. Shielded cooling air exhaust openings 64' (see FIG. 18) are made in bottom panel 64.

The wheels 45 are adapted to engage the bottom run of the track 29 between the sprocket or toothed wheels 37 and the front roller 44 at the pivotal connection 31.

Several wheels 45 are secured to a common shaft 73 rotatably journalled at its ends to a wheel support 74 common to several shafts 73 and removably secured underneath the bottom member of the frame 30. Alternately, the shafts 73 may be fixed to the support 74 and the wheels rotatably mounted thereon by means of suitable bearings.

Obviously, the wheels 45 on each shaft 73 may be replaced by a single roller and, conversely, the rollers 42,43,44 may be replaced by several wheels.

As more particularly shown in FIG. 18, the wheels 45 impart to the track bottom run an outwardly convex shape with the middle wheels 45' being the most distant from the underside of the box-like frame 30. Thus, on a flat hard surface, the track bottom run will normally engage the said surface along a restricted longitudinal zone, namely: the distance corresponding to two adjacent sets of wheels 45. The particular zone will vary in accordance with the angular relationship of the undercarriage with respect to the supporting surface.

Because the track engages hard ground over a limited zone, the vehicle is much easier to steer on pavement and the like. Yet the floatation characteristics of the track are not substantially impaired in soft snow.

Similar easier steering can be obtained on a conventional snowmobile by providing curved runners or by so arranging the spring-loaded bogey wheels that one set will exert greater downward pressure on the track bottom run than the other sets.

To prevent snow and other material from accumulating on the inside surface of the track 29, a snow plough arrangement 75 is provided. It consists of a V-shaped plate extending between the bottom track run and the underside of the frame 30 being secured to said frame. The bottom edge of the V-shaped plough 75 is in close relation with the inside surface of the track 29. The plough 75 is provided with slots 76, as shown in FIG. 11, to accommodate wheels 45.

Shock absorbers 77 are pivotally connected at their upper ends 77' to the top portion of frame 30 and at their lower ends to the snowmobile chassis A by means of removable bolts 78. There is one shock absorber on each side of frame 30 and disposed on the outside of the subcarriage box being mounted in cavities 79 formed in the side panels 65 of said box.

The shock absorbers 77 are of conventional construction and resiliently resist the upward and downward pivotal movement of the subcarriage 28 with respect to the snowmobile chassis A. They are preferably provided with coil springs (not shown) surrounding the shock absorber proper. These shock absorbers connect the chassis A and the frame 30 in a zone longitudinally spaced from the pivotal connection 31.

To start the engine 32, which is preferably of the type normally found in motocycles or scooters, a kickdown starting lever 80 extends on the outside of the hood 5 at a convenient position for operation by the driver's foot. Said kickdown lever is operatively connected to the engine 32 and extends through a slot 81 made in the hood 5 and through a suitable hole made in the resistering side panel 65 of the box formed by frame 30.

Referring to FIGS. 4 to 6, it is seen that the vehicle body may be modified as to its overall shape and seating arrangement, while preserving the same type of subcarriage 28 and hood 5. In this case, the front portion of the snowmobile chassis is made longer and an additional seat 82 is disposed on platform 2 with a back-rest 83 directly in front of the front wall 8 of the hood 5. The front wall 3' is modified to form a hood for receiving the extended legs of the seated passenger. Obviously, a wider vehicle, similar to that of FIGS. 4 to 6, can be provided with two seats 82 side by side for seating two passengers in the front compartment. In this case, it is preferable to have two tracks 29 disposed side by side.

A crash bar 84 is preferably provided just behind back-rest 83.

A further modified model of the vehicle consists in the model of FIGS. 4 to 6, but with seat 12 removed and the rear end streamlined as in a racing car.

It is easy to convert the vehicle for summer use; the skis are replaced by steerable pneumatic wheels, the belt 29 is removed and pneumatic wheels may be secured to the shaft of driving sprocket 37; if the latter wheels are not used, the wheels 45 will directly contact the ground. The noise produced by engine and the transmission to the sprocket wheels 37 is deadened, because these elements are enclosed in two nested boxes, namely box-like subframe 30 and the box-like enclosure formed by the chassis rear portion. Furthermore, the cooling air for the engine and, preferably, also the engine exhaust gases are discharged into the space between the bottom run of the endless track and the bottom wall 64 of the subframe 30 further reducing the noise.

I claim:

1. In an endless track motor vehicle, a chassis having a front portion and a rear portion, a steerable ground-engaging member carried by said chassis front portion under the same, said chassis rear portion being hollow, having a top, sides, front and back, and having a bottom opening, and a sub-carriage disposed within said hollow chassis rear portion and protruding therefrom through said bottom opening, said sub-carriage including a subframe, an endless track surrounding said subframe and having a bottom run adapted to engage and thrust against the ground for moving the vehicle thereon, track-engaging means carried by said subframe for maintaining said track around said subframe with the top and bottom runs of the track spaced around said subframe with the top and bottom runs of the track spaced from each other, said track-engaging means encompassed by the said track, motor means entirely mounted within said subframe, wheel means carried by said subframe and contacting the inside of said track for driving the latter around said subframe, said motor means drivingly connected to said wheel means, said subframe connected to said chassis for up and down movement of said subframe relative to said chassis, resilient suspension means connecting said chassis and said subframe for resiliently resisting said movement, a passenger seat carried by said chassis front portion, connected to said steerable ground-engaging member and accessible to a driver seated on said seat.

2. In an endless track motor vehicle as claimed in claim 1, wherein said steerable ground-engaging and vehicle supporting member is a ski and said track-engaging means exert unequal downward pressure on the bottom run of said track, whereby said track is caused to engage a flat supporting hard surface with a greater pressure on a localized restricted longitudinal zone of said bottom run than on the remaining longitudinal zone of said run.

3. In an endless track motor vehicle as claimed in claim 1, wherein said passenger seat is secured to the top of said chassis rear portion.

4. In an endless track motor vehicle as claimed in claim 1, wherein said chassis front portion defines a platform disposed at a lower level than the top of said chassis rear portion and a guard wall is upstanding from the front end of said platform.

5. In an endless track motor vehicle as claimed in claim 4, further including a passenger seat carried by said platform and a back-rest for said seat in front of said chassis rear portion.

6. In an endless track motor vehicle as claimed in claim 5, further including a passenger seat resting on the top of said chassis rear portion.

7. In an endless track motor vehicle as claimed in claim 1, wherein said subframe is pivoted to said chassis about a horizontal axis transverse to the longitudinal axis of said vehicle for pivotal movement in a vertical plane and said resilient suspension means are connected to said subframe at points longitudinally spaced from the pivotal connection of said subframe to said chassis.

8. In an endless track motor vehicle as claimed in claim 7, wherein at least one of said track-engaging means is movably mounted on said sub-frame, and means to adjust the position of said last-named track-engaging means on said frame to adjust the tension of said endless track.

9. In an endless track motor vehicle as claimed in claim 7, wherein said steerable ground-engaging and vehicle supporting member consists in a snow-engaging ski and further including a plow member carried and by said sub-frame and extending just over the inside surface of the bottom run of said track to expel snow and other material which may accumulate on said track bottom run.

10. In an endless track motor vehicle as claimed in claim 7, wherein said wheel means for driving said track are located at the trailing end of the bottom run of said track with respect to the normal advancing movement of said vehicle, so as to exert a direct pull on said track bottom run.

11. In an endless track motor vehicle as claimed in claim 7, wherein said steerable ground-engaging and vehicle supporting member is a ski and the track-engaging means engaging the bottom run of said track, confer to said bottom run an outwardly convex shape, whereby said bottom run will contact a flat hard support surface along a restricted longitudinal zone.

12. In an endless track motor vehicle as claimed in claim 7, wherein said motor means is an internal combustion engine and further including a fuel reservoir for said engine, said reservoir carried by said chassis rear portion within the same, but exteriorly of said subframe and track.

13. In an endless track motor vehicle as claimed in claim 7, wherein said subframe is pivotally connected to said chassis at the rear end thereof and said resilient suspension means are connected to said subframe at the front end portion thereof.

14. In an endless track motor vehicle as claimed in claim 7, further including shock-absorbing means associated with said resilient suspension means.

15. In an endless track motor vehicle as claimed in claim 7, wherein said endless track consists in an endless flexible rubber belt.

16. In an endless track motor vehicle as claimed in claim 15, wherein said rubber belt has a ground-engaging contacting surface provided with straight ribs arranged in two rows longitudinally of the track, the ribs of each row being substantially parallel to each other, the ribs of one row being inclined with respect to the long axis of said track in a direction opposite to the inclination of the ribs of the other row to form a chevron-like pattern.

17. In an endless track motor vehicle as claimed in claim 7, wherein said steerable ground-engaging and vehicle supporting member is a ski carried by and mounted underneath said main end portion.

18. In an endless track motor vehicle as claimed in claim 17, wherein said ski has a longitudinally extending central groove at its ground contacting undersurface and has a downwardly extending flange along each of its longitudinal side edges.

19. In an endless track motor vehicle as claimed in claim 18, further including rod-like members extending longitudinally of said ski at the underface thereof and secured thereto inwardly of and adjacent said flanges.

20. In an endless track motor vehicle as claimed in claim 18, wherein both ends of said ski are curved upwardly.

21. In an endless track motor vehicle as claimed in claim 18, wherein the intermediate portion of said ski has a smaller width than both end portions of said ski.

22. In an endless track motor vehicle as claimed in claim 18, wherein said longitudinal edges are slightly concave when the ski is seen in plan view to define end portions of said ski of greater width than the central portion thereof.

23. In an endless track motor vehicle as claimed in claim 7, wherein said track-engaging means are unsprung with respect to said subframe.

24. In an endless track motor vehicle as claimed in claim 23, wherein said wheel means are mounted on transverse shafts unsprung with respect to said subframe.

25. In an endless track motor vehicle as claimed in claim 23, wherein said steerable ground-engaging and vehicle supporting member is a ski and wherein the track-engaging means engaging the track bottom run, confer to the latter an outwardly convex shape longitudinally of the track.

26. In an endless track motor vehicle as claimed in claim 7, wherein said resilient suspension means are removably connected to said subframe and said pivotal connection of said subframe to said chassis comprises a tube secured to said subframe and extending transversely thereof and a rod removably extending through said tube and removably secured to the chassis rear portion, whereby removal of said rod from said chassis and tube releases the pivotal connection of said subframe to said chassis.

27. In an endless track motor vehicle as claimed in claim 29, wherein said motor means is an internal combustion engine and said subframe box has air circulating openings shielded against said snow or said other foreign material.

28. In an endless track motor vehicle as claimed in claim 27, wherein said subframe box has a bottom wall spaced above the track bottom run, said bottom wall having openings for the escape of gases from within said subframe box into the space between said subframe box bottom wall and said track bottom run.

29. In an endless track motor vehicle as claimed in claim 7, wherein said chassis rear portion forms a box-like enclosure open at the bottom and said subframe forms a substantially closed box surrounded by said track and enclosing said motor means to deaden the noise thereof and to prevent snow and other foreign material, which may be entrained by said track, from reaching said motor means.

30. In an endless track motor vehicle as claimed in claim 29, wherein said box-like enclosure and said subframe box have registering lateral service openings to give access to said motor means and removable covers for said service openings.

31. In an endless track motor vehicle as claimed in claim 7, wherein said subframe is pivotally connected to said chassis at the front end portion thereof and said resilient suspension means are connected to said subframe at the rear end portion thereof.

* * * * *